United States Patent [19]

Burroughs

[11] 4,007,252
[45] Feb. 8, 1977

[54] STABILIZED SODIUM ALUMINATE SOLUTIONS
[75] Inventor: James E. Burroughs, Mount Prospect, Ill.
[73] Assignee: Borg-Warner Corporation, Chicago, Ill.
[22] Filed: Sept. 2, 1975
[21] Appl. No.: 609,321
[52] U.S. Cl. .............................. 423/265; 252/403; 423/600
[51] Int. Cl.² .......................................... C01F 7/02
[58] Field of Search .................. 423/119, 265, 600; 252/403

[56] References Cited
UNITED STATES PATENTS

| | | | |
|---|---|---|---|
| 1,157,436 | 10/1915 | Spence et al. | 423/265 |
| 2,345,134 | 3/1944 | Lindsay et al. | 423/265 |
| 2,734,796 | 2/1956 | Ashley et al. | 423/265 |
| 2,749,316 | 6/1956 | Coates | 423/265 |
| 3,656,889 | 4/1972 | Olewinski | 423/265 |

OTHER PUBLICATIONS

Prescott et al., "Metal Finishing", Oct. 1953, pp. 65–67.

Primary Examiner—Herbert T. Carter
Attorney, Agent, or Firm—William S. McCurry

[57] ABSTRACT

Aqueous solutions of sodium aluminate ($Na_2Al_2O_4$) are stabilized by the addition of triethanolamine.

2 Claims, No Drawings

STABILIZED SODIUM ALUMINATE SOLUTIONS

BACKGROUND OF THE INVENTION

Sodium aluminate ($Na_2Al_2O_4$) is used for many and diverse applications such as in the chemical process industries, in the textile industry, and in the oil industry. It is used specifically for gelling liquid hydrocarbons which are used for fracturing oil bearing formations in secondary recovery operations in oil well production. When used as a powder or in lump form, the resulting dust is hazardous and irritating to humans. In oil field operations, such problems are magnified when large bags of dry sodium aluminate are used.

The dry sodium aluminate powder or lump may be dissolved in water to reduce the dust hazard but such problems are magnified when large bags of dry sodium aluminate are used.

The dry sodium aluminate powder or lump may be dissolved in water to reduce the dust hazard but such solutions are chemically unstable with respect to time. Ordinarily, highly concentrated solutions of sodium aluminate will cause conversion of the aluminate to water-insoluble aluminum oxide hydrates within a few hours, thereby impairing the chemical composition and applications of the precipitate-containing solutions.

SUMMARY OF THE INVENTION

The present invention relates to the discovery that stable sodium aluminate solutions can be prepared by dissolving the dry sodium aluminate in a mixture of water and triethanolamine. The degree of stabilization increases with the triethanolamine concentration relative to increases in the sodium aluminate concentration. Practical concentrations of sodium aluminate are between about 1 and about 25% and for the triethanolamine from about 5 to about 50%, based on the total formulated weight, with the remainder 25% to 94% being water.

While the exact reason for the stabilization is not understood, it is believed that stabilization occurs because of the formulation of an ionized or dissociated aluminum chelate which is stable in the highly alkaline aluminate environment, but which is sufficiently weak as not to impair the chemical integrity of the sodium aluminate solution.

DESCRIPTION OF THE PREFERRED EMBODIMENT

To best understand the principles of the present invention, the following example is provided for illustrative purposes only.

EXAMPLE 25 g. of sodium aluminate ($Na_2Al_2O_4$) is dissolved in a solution of 25 g. of triethanolamine and 75 g. of water. The resulting solution was clear and stable for a period of 30 days at which time it was used in the preparation of a gelled hydrocarbon.

As is the case for all highly caustic solutions, the stabilized sodium aluminate solution of the present invention must be stored in such a manner as to avoid absorption of carbon dioxide, thus preventing the formation of carbonates, which result in an unstable solution.

While this invention has been described in connection with a certain specific embodiment thereof, it is to be understood that this is by way of illustration and not by way of limitation; and the scope of the appended claims should be construed as broadly as the prior art will permit.

I claim:

1. A chemically stable sodium aluminate solution which comprises, based on the total formulated weight, from about 1 to about 25% sodium aluminate; from about 25 to about 94% water; and from about 5 to about 50% triethanolamine.

2. The chemically stable sodium aluminate solution of claim 1 wherein the solution comprises, based on the total formulated weight, 25% sodium aluminate; 75% water; and 25% triethanolamine.

* * * * *